US009511638B2

(12) United States Patent
Meenen et al.

(10) Patent No.: US 9,511,638 B2
(45) Date of Patent: Dec. 6, 2016

(54) TRANSPORT HITCH SYSTEM AND METHOD (71) Applicant: Bestway, Inc., Hiawatha, KS (US)

(72) Inventors: Don Patrick Meenen, Hiawatha, KS (US); David C. Benson, Hiawatha, KS (US); Michael A. Brainard, Hiawatha, KS (US)

(73) Assignee: Bestway, Inc., Hiawatha, KS (US)

( * ) Notice: Subject to any disclaimer, the term of this patent is extended or adjusted under 35 U.S.C. 154(b) by 0 days.

(21) Appl. No.: 14/675,222

(22) Filed: Mar. 31, 2015

(65) Prior Publication Data
US 2015/0202934 A1 Jul. 23, 2015

Related U.S. Application Data (63) Continuation of application No. 13/220,442, filed on Aug. 29, 2011, now Pat. No. 8,992,155.

(51) Int. Cl.
*B60F 5/00* (2006.01)
*B60D 1/46* (2006.01)
(Continued)

(52) U.S. Cl.
CPC ............... *B60D 1/465* (2013.01); *B60D 1/01* (2013.01); *B60D 1/075* (2013.01); *B62D 53/0842* (2013.01)

(58) Field of Classification Search
CPC ............ B60D 1/465; B60D 1/075; B60P 3/12; B60P 3/125; B62D 53/0828
(Continued)

(56) References Cited

U.S. PATENT DOCUMENTS 3,620,393 A * 11/1971 Bubik ................ B60P 3/125
                                                     280/402
3,715,042 A    2/1973 Rellinger
(Continued)

FOREIGN PATENT DOCUMENTS

EP           1810878        7/2007

OTHER PUBLICATIONS

Pro-Tote, "Daisy Mule", http://www.protote.com/daisy-mule.html, Dec. 28, 2011.
(Continued)

*Primary Examiner* — Kaitlin Joerger
(74) *Attorney, Agent, or Firm* — Law Office of Mark Brown, LLC; Mark E. Brown; Christopher M. DeBacker (57) ABSTRACT

A transport hitch apparatus which is attached to a standard semi-truck tractor via the truck's frame and fifth-wheel, and which is capable of lifting and towing agricultural implements using an array of different hitch connections. The transport hitch is customizable, and is capable of conforming to several semi-truck tractor frame types and implement hitch types. In the practice of an aspect of the present invention, an agricultural implement is attached to the transport apparatus via a two-point or drawbar hitch. The transport apparatus includes a self-contained electrically powered hydraulic lift system capable of lifting large agricultural implements for transport. The transport apparatus is mounted to a tandem axle semi-truck tractor fifth wheel and frame. The transport apparatus is designed to quickly attach to any standard semi-truck tractor. The hydraulic lift system allows implements of any shape or size to be raised or lowered to an ideal towing height.

9 Claims, 9 Drawing Sheets (51) Int. Cl.
  *B60D 1/07* (2006.01)
  *B60D 1/01* (2006.01)
  *B62D 53/08* (2006.01)

(58) Field of Classification Search
  USPC ....... 414/540, 563; 280/402, 416.1; 172/439
  See application file for complete search history.

(56) References Cited

U.S. PATENT DOCUMENTS

| | | | |
|---|---|---|---|
| 4,543,030 A | 9/1985 | Hawkins | |
| 5,486,082 A * | 1/1996 | Feldman | B60P 1/5457 212/252 |
| 5,823,735 A * | 10/1998 | Kooima | B62D 53/0828 280/402 |
| 6,033,177 A * | 3/2000 | Kooima | B61D 15/00 254/2 R |
| 6,036,428 A | 3/2000 | Kooima | |
| 7,048,070 B2 * | 5/2006 | Powell | B60D 1/141 172/439 |
| 7,100,933 B2 * | 9/2006 | Zackovich | B60P 3/12 280/402 |
| 7,909,561 B2 * | 3/2011 | Addleman | B60P 3/125 414/563 |
| 8,011,873 B2 * | 9/2011 | Kooima | B60P 3/125 414/563 |
| 8,267,419 B2 * | 9/2012 | Schuettenberg | B60D 1/00 280/402 |
| 8,690,514 B2 * | 4/2014 | Marola | B60P 3/125 212/232 |
| 2004/0081542 A1 * | 4/2004 | Nolasco | B60P 3/125 414/563 |
| 2004/0091346 A1 * | 5/2004 | Wobben | B60P 3/40 414/563 |
| 2004/0188111 A1 | 9/2004 | Wood, Jr. | |
| 2005/0023797 A1 * | 2/2005 | Zackovich | B60P 3/12 280/415.1 |
| 2006/0081382 A1 * | 4/2006 | Tuttle | A01B 59/062 172/439 |
| 2007/0169951 A1 * | 7/2007 | Clement | A01B 59/062 172/439 |
| 2009/0039615 A1 * | 2/2009 | Johnson | B60D 1/07 280/416.1 |
| 2010/0038881 A1 * | 2/2010 | Ford | B60D 1/015 280/416.1 |
| 2011/0170997 A1 * | 7/2011 | Addleman | B66F 9/061 414/563 |
| 2011/0181016 A1 * | 7/2011 | Schuettenberg | B60D 1/00 280/402 |
| 2011/0182706 A1 * | 7/2011 | Marola | B60P 3/125 414/561 |

OTHER PUBLICATIONS

Zacklift, "Fifthwheeler", http://www.zacklift.com/Fifthwheeler/Fifth.htm, Dec. 28, 2011.

* cited by examiner

TRANSPORT HITCH SYSTEM AND METHOD

CROSS-REFERENCE TO RELATED APPLICATION

This patent application is a continuation of and claims priority in U.S. patent application Ser. No. 13/220,442, filed on Aug. 29, 2011. The entire disclosure of the above-noted patent application is incorporated by reference in its entirety herein.

BACKGROUND OF THE INVENTION

1. Field of the Invention

The present invention relates generally to a loading system for a vehicle, and particularly to a lift and hitch system for loading, transporting, and unloading equipment, such as agricultural implements, onto a standard semi-truck tractor.

2. Description of the Related Art

Implements and equipment for tillage, cultivation and other agricultural operations have been developed with the objectives of increasing efficiency and lowering operating costs. These mechanical agricultural implements typically connect to tractors and other machinery via several connection types, such as Cat. II or Cat. III two-point hitch, or via a removable drawbar type hitch. It is important to be able to move these heavy agricultural implements from one location to another and to quickly load and unload the equipment.

With the ever increasing size of planters, drills, grain carts and tillage equipment, it is no longer safe or feasible to tow these types of agricultural implements of husbandry with a pickup, one-ton or two-ton truck. This makes delivery and pickup of these implements a challenge for dealers and either has to be done with a farm tractor or the implement has to be loaded on a semi-trailer. Both of these delivery solutions have great limitations.

Modern agricultural operations commonly require equipment adapted for transporting over public roads. For example, many farmers and farming operations work multiple, noncontiguous fields with the same equipment, which must be configured to comply with traffic regulations, including maximum width requirements. Various implement transport mechanisms have been developed for this purpose. For example, implements are commonly designed to fold and unfold between field use and transport configurations.

Transporting oversize implements commonly involves placing them on transport vehicles, such as trailers, with their long dimensions generally aligned with the direction of travel. For example, the Mefferd et al. U.S. Pat. No. 4,060,259 shows an implement supported on auxiliary wheels and drawn by a vehicle attached to an end of the implement. Alternatively, an implement can be reoriented by a device that rotates it. For example, the Van Selus U.S. Pat. No. 3,727,698 discloses a trailer apparatus incorporating a turntable supported on a trailer body wherein a lift and support assembly is mounted on the turntable for lifting an implement and supporting it in an elevated position with the elongated dimension of the implement extending parallel to the direction of travel.

A further example is shown in the Shannon U.S. Pat. No. 4,286,918, which discloses an implement transporter including a trailer having a lifting and rotating mechanism for engaging, lifting and rotating an implement. The weight of the implement is supported by a roller, and the lifting mechanism is guided through an arcuate path-of-movement by an arm pivoted adjacent to one side of the trailer whereby the supported implement may be rotated 90 degrees relative to the trailer.

Yet another example is shown in the Pingry et al. U.S. Pat. No. 6,238,170, which describes an implement transporter including a trailer having a lifting and rotating mechanism for engaging, lifting and rotating the implement. The trailer includes a turntable supporting a cantilevered arm and the cantilevered arm includes a lift and support assembly.

Additional examples of lift systems adapted for use with standard semi-truck tractors includes the Pro-Tote® Daisy Mule®, which modifies a standard truck wrecker modified to pull agricultural implements, and the Zacklift™ Fifthwheeler, which allows a standard semi-truck tractor to be converted into a towing wrecker for transporting other semi-truck tractors over the road. However, these modifications lack the versatility to connect with, lift, and haul the wide variety of agricultural implements available today. For example, the Daisy Mule® is limited to use with only Cat. III quick hitch systems and a removable drawbar. The Zacklift™ Fifthwheeler is limited to transforming a standard semi-truck tractor into a wrecker, and is incapable of lifting and transporting agricultural implements.

The existing hitch systems cannot quickly or easily transform from a Cat. III hitch to a Cat. II hitch. Modifying an existing hitch to accept a Cat. II or Cat. III quick hitch would require that the quick hitch be completely removed and a new quick hitch system be installed. Quick hitch systems weigh upwards of 250 pounds and require time to be installed. Further, existing hitch systems employ a lift placed relative to a semi-truck's fifth wheel and requires that the hitch extend well beyond the end of the truck frame. This increases the moment arm of the hitch, and therefore increases weight load on the hitch system, leading to increased wear.

Other examples of lift systems adapted for use with standard semi-truck tractors further includes U.S. Pat. Nos. 5,823,735 and 6,036,428 to Kooima, U.S. Pat. No. 7,100,933 to Zackovich, U.S. Pat. No. 4,543,030 to Hawkins, and U.S. Pat. No. 3,715,042 to Rellinger. These lift systems discuss attaching a lift system to a standard semi-truck tractor via the fifth wheel.

What is desired is a lift system capable of connecting to a standard semi-truck tractor adapted for lifting and hauling agricultural implements having a variety of connection types, including Cat. II two-point hitch connections, Cat. III two-point hitch connections, and draw bar connections.

Heretofore there has not been available a lift mechanism with the advantages and features of the present invention.

BRIEF SUMMARY OF THE INVENTION

The present invention relates to a transport hitch which is attached to a standard semi-truck tractor via a fifth-wheel connection, and which is capable of lifting and hauling agricultural implements using an array of different hitch connections. The present invention is also highly customizable, and is capable of conforming to several semi-truck tractor frame types. The present invention is intended to benefit farmers, farm equipment dealers, and transporters who have a need for transporting large agricultural implements quickly and safely.

In the practice of an aspect of the present invention, an agricultural implement is attached to the transport apparatus via a two-point or drawbar hitch. The transport apparatus may include a self-contained electrically powered hydraulic lift system capable of lifting large agricultural implements for transport. Alternatively, the transport apparatus may be hydraulically connected to the semi-truck tractor using a wet kit configuration, such that the apparatus is powered by and operated from the semi-truck. The transport apparatus is mounted to a tandem axle semi-truck tractor fifth wheel and frame. The transport apparatus is designed to quickly attach to any standard semi-truck tractor. The hydraulic lift system allows implements of any shape or size to be raised or lowered to an ideal towing height.

The vertical lift ensures that the drawbar hitch is kept perfectly level when an implement is lifted, as opposed to existing hitches which lift in an arc causing a drawbar to be elevated at an angle that increases the stress upon the bar and the implement being lifted.

BRIEF DESCRIPTION OF THE DRAWINGS

The drawings constitute a part of this specification and include exemplary embodiments of the present invention illustrating various objects and features thereof

DETAILED DESCRIPTION OF THE PREFERRED EMBODIMENTS

I. Introduction and Environment

As required, detailed aspects of the present invention are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment or Aspect Transport Hitch System 2

Referring to the drawings in more detail; the reference numeral 2 generally designates a transport hitch system capable of loading agricultural implements and lifting them to an ideal towing height, as shown in FIGS. 1-9. Without limitation on the range of useful applications of the transport hitch system 2, an exemplary application is disclosed comprising: a main beam member 12, a lift mast 6, and a lift assembly 4. The transport hitch system 2 can be affixed to a standard semi-truck tractor 24 via the fifth wheel 28 and the truck frame 26.

Figure 1:
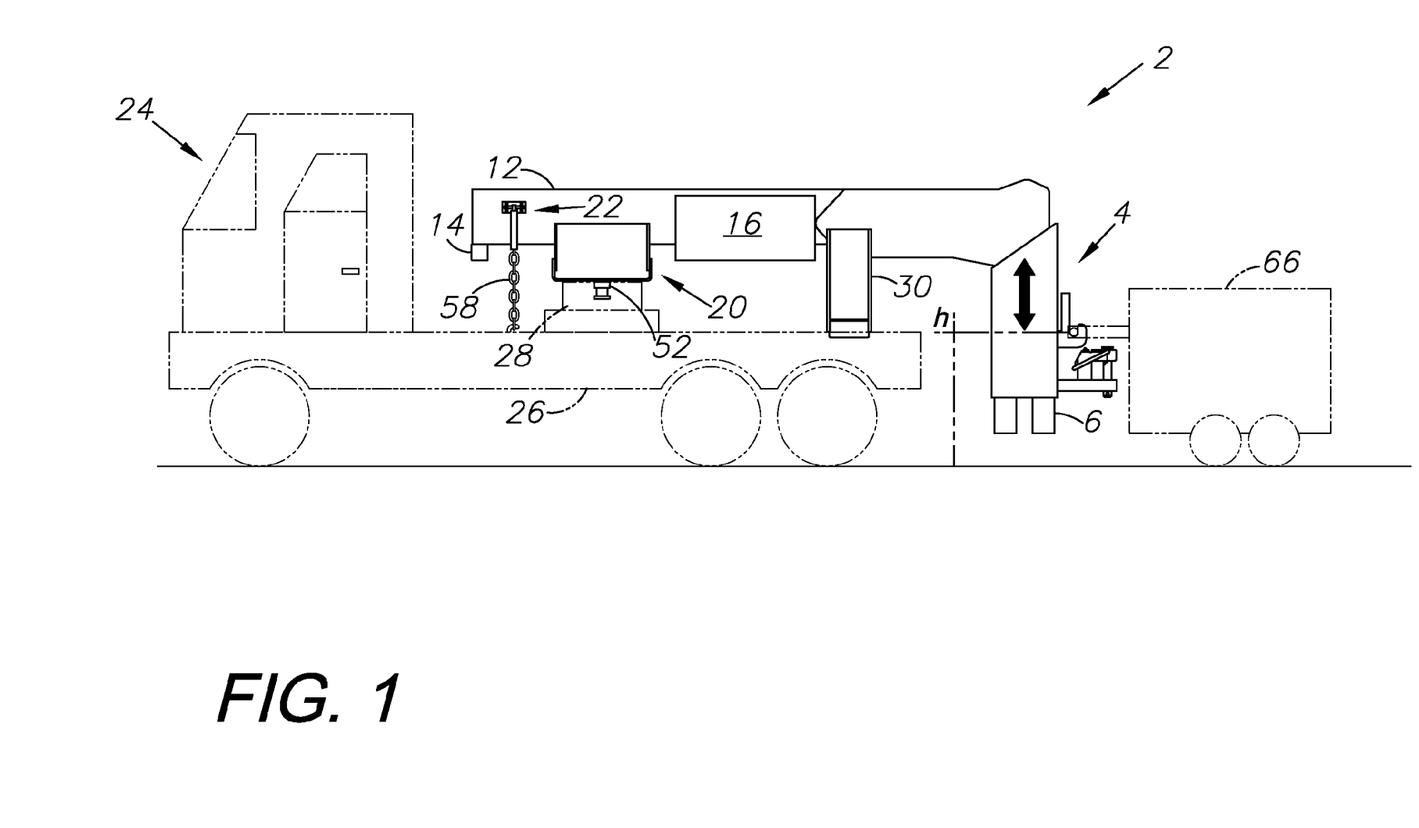
FIG. 1 is a side elevation view showing an embodiment of the present invention interacting with a typical environment.

Referring to FIG. 1, the transport hitch system 2 is adapted to be mounted to a standard semi-truck tractor 24. A frame mount assembly 30, comprised of steel plate members, is bolted to the main beam member 12 and includes grooves 32 allowing the frame mount assembly 30 to connect to a standard semi-truck frame 26. A kingpin connection assembly 20, comprised of steel plate members and a kingpin 52, is bolted to the main beam member 12. The kingpin connection assembly 20 allows the transport hitch system 2 to mount directly to the fifth wheel 28 of a standard semi-truck tractor 24. A pair of binder assemblies 22 bolted to either side of the main beam member 12 provides a third connection between the transport hitch system 2 and the semi-truck 24.

FIG. 1 generally demonstrates how, once the transport hitch system 2 is mounted to a semi-truck 26, the lift assembly 4 is capable of being raised or lowered along the lift mast 6. When lowered, the lift assembly 4 is capable of receiving an agricultural implement 66 and raising the implement to an ideal towing height h. The typical agricultural implement 66 includes wheels which remain on the ground for towing.

Figure 2:
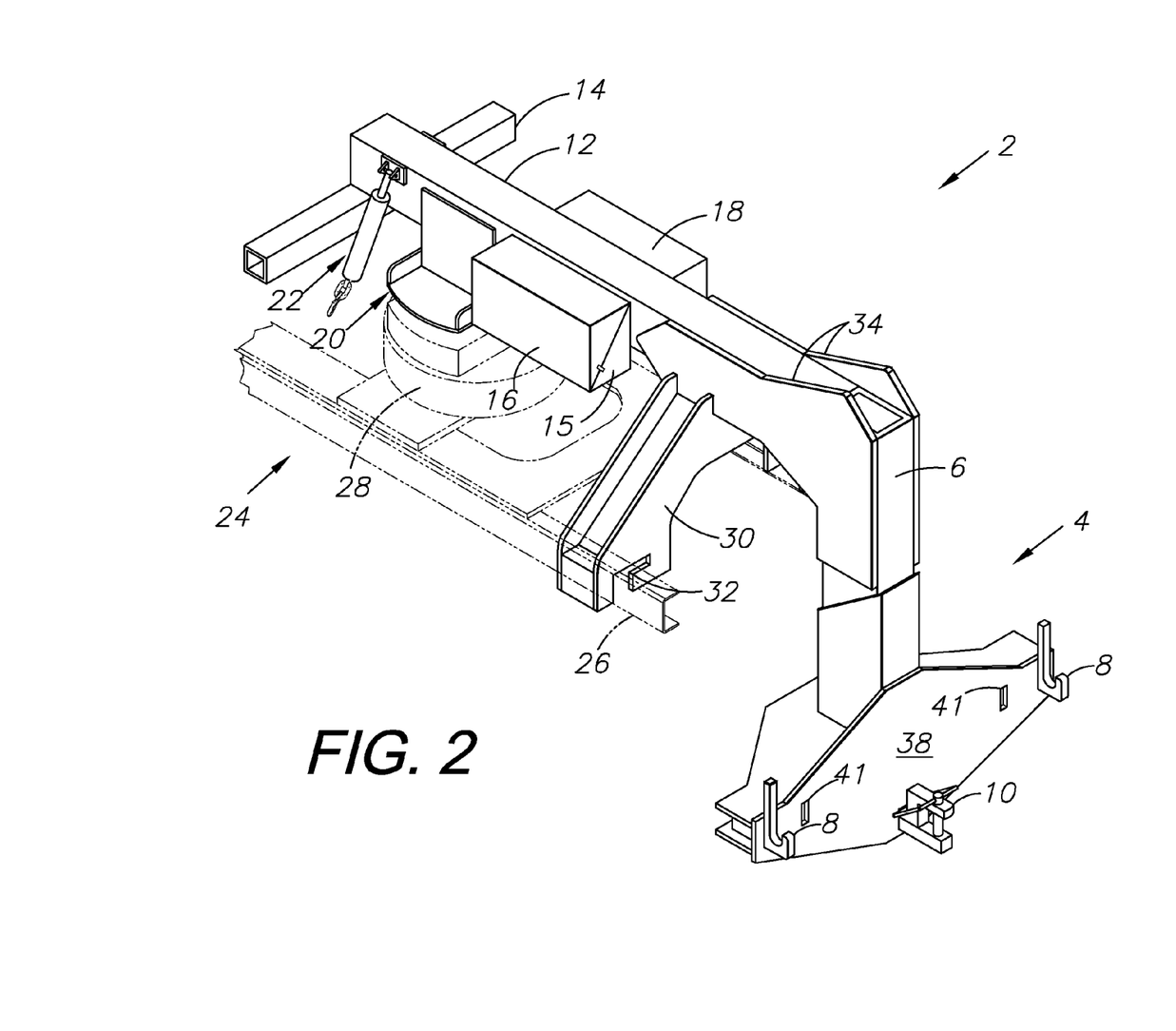
FIG. 2 is an isometric view of an embodiment of the present invention with the lift assembly in a raised position.
Figure 3:
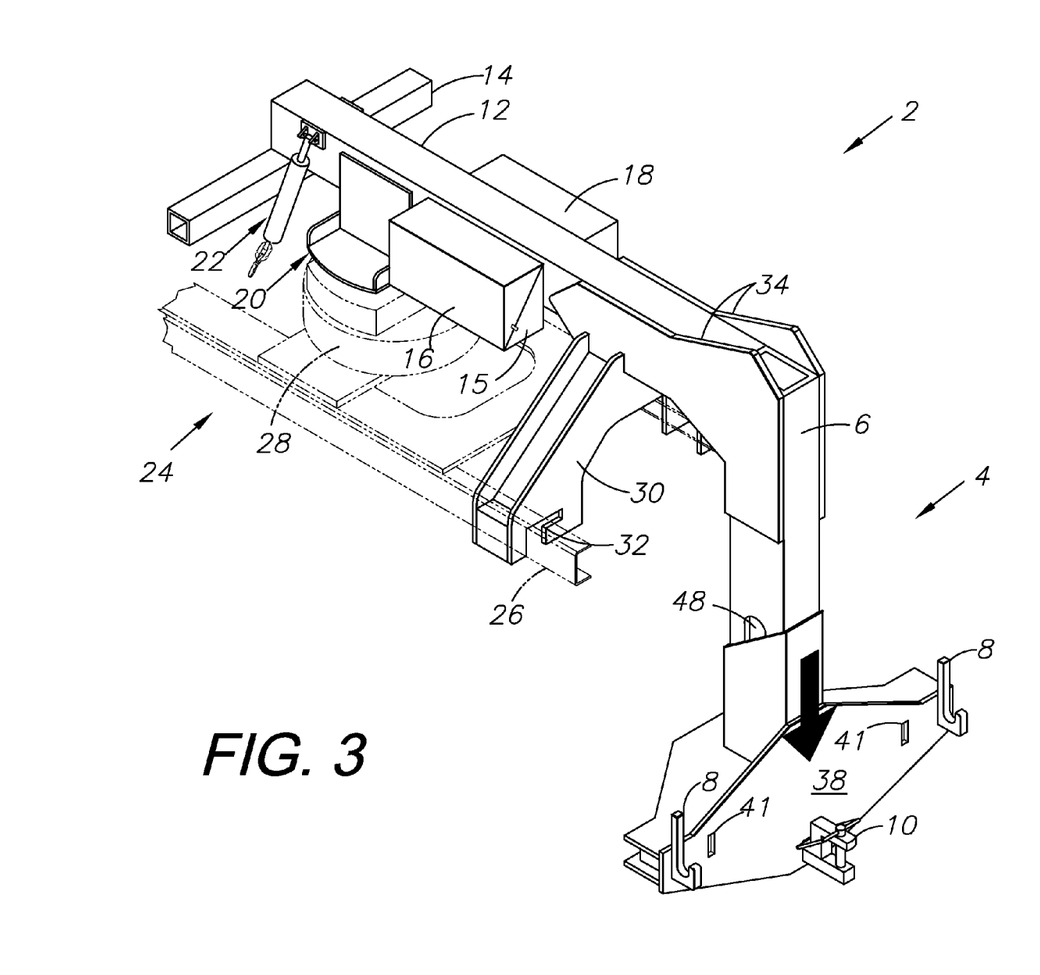
FIG. 3 is an isometric view of an embodiment of the present invention with the lift assembly in a lowered position.
Figure 4:
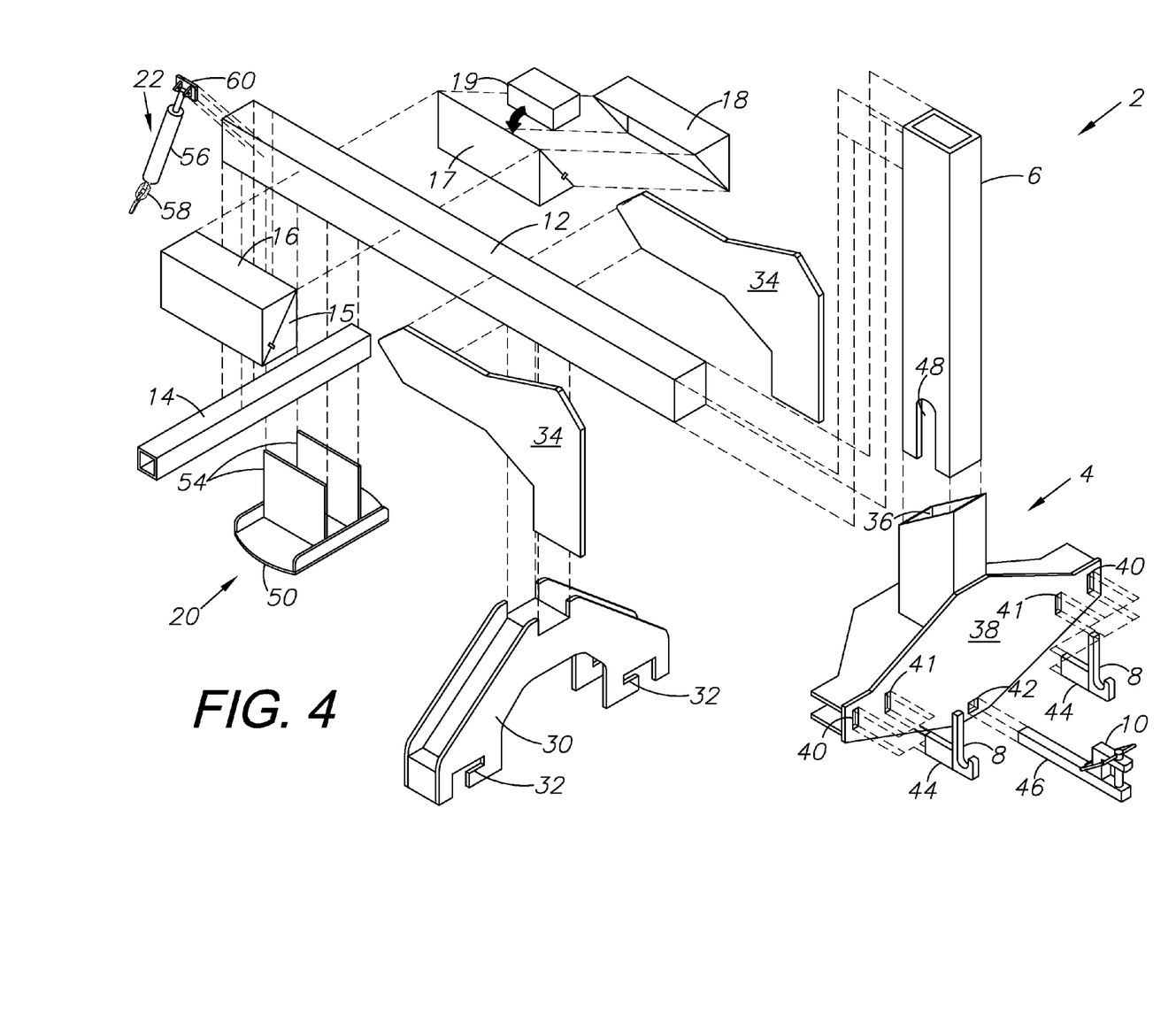
FIG. 4 is an exploded, isometric view of an embodiment of the present invention.

FIGS. 2-4 show the transport hitch system 2 in further detail. FIG. 2 demonstrates an embodiment of the transport hitch system 2 wherein the lift assembly 4 is in a raised position, whereas FIG. 3 demonstrates the same embodiment of the transport hitch system 2 wherein the lift assembly 4 is in a lowered position. FIG. 4 is an exploded view of the same embodiment of the transport hitch system 2. The lift assembly 4 is further comprised of a lift assembly rear plate 38 which includes a pair of hook receiver slots 40 spaced to receive a Cat. III two-point hitch, a pair of hook receiver slots 41 spaced to receive a Cat. II two-point hitch, and a hitch pin receiver slot 42. The hooks 8 are also capable of receiving a heavy duty drawbar and towing an implement by the drawbar.

A pair of mounting hooks 8 can be inserted into the hook receiver slots 40 or 41, depending on the desired hitch connection. The mounting hooks 8 include hook tabs 44 which are received by the hook receiver slots 40, 41. The mounting hooks may further be secured into the hook receiver slots with bolts, a securing pin 64, or through some other temporary mechanical connection. A hitch pin 10 including a hitch pin tab 46 is similarly mounted into the hitch pin receiver slot 42 and secured via bolts, a securing pin, or through some other temporary mechanical connection.

The lift assembly 4 is mounted onto the lift mast 6, which includes a relief 48. The lift assembly may be powered mechanically, by hydraulics, or by other means. The lift mast 6 includes a hollow core capable of containing hydraulic and electrical components and lines and protecting those components and lines from the elements. The relief 48 may be used to prevent the lift assembly 4 from being raised beyond a maximum point at the apex of the relief The lift mast 6 is attached to the main beam member 12 via a pair of side panels 34, forming a general "L" shape between the main beam member 12 and the lift mast 6. This provides greater structural support to the entire system. This also allows the lift assembly 4 to rise along a single axis. The side panels are comprised of plate steel and may be bolted or otherwise connected to both the main beam member 12 and the lift mast 6. These components form the main body of the transport hitch system 2. The main beam member 12 may include hollow portions capable of containing hydraulic and electrical components and lines and protecting those lines and components from the elements.

Figure 5:
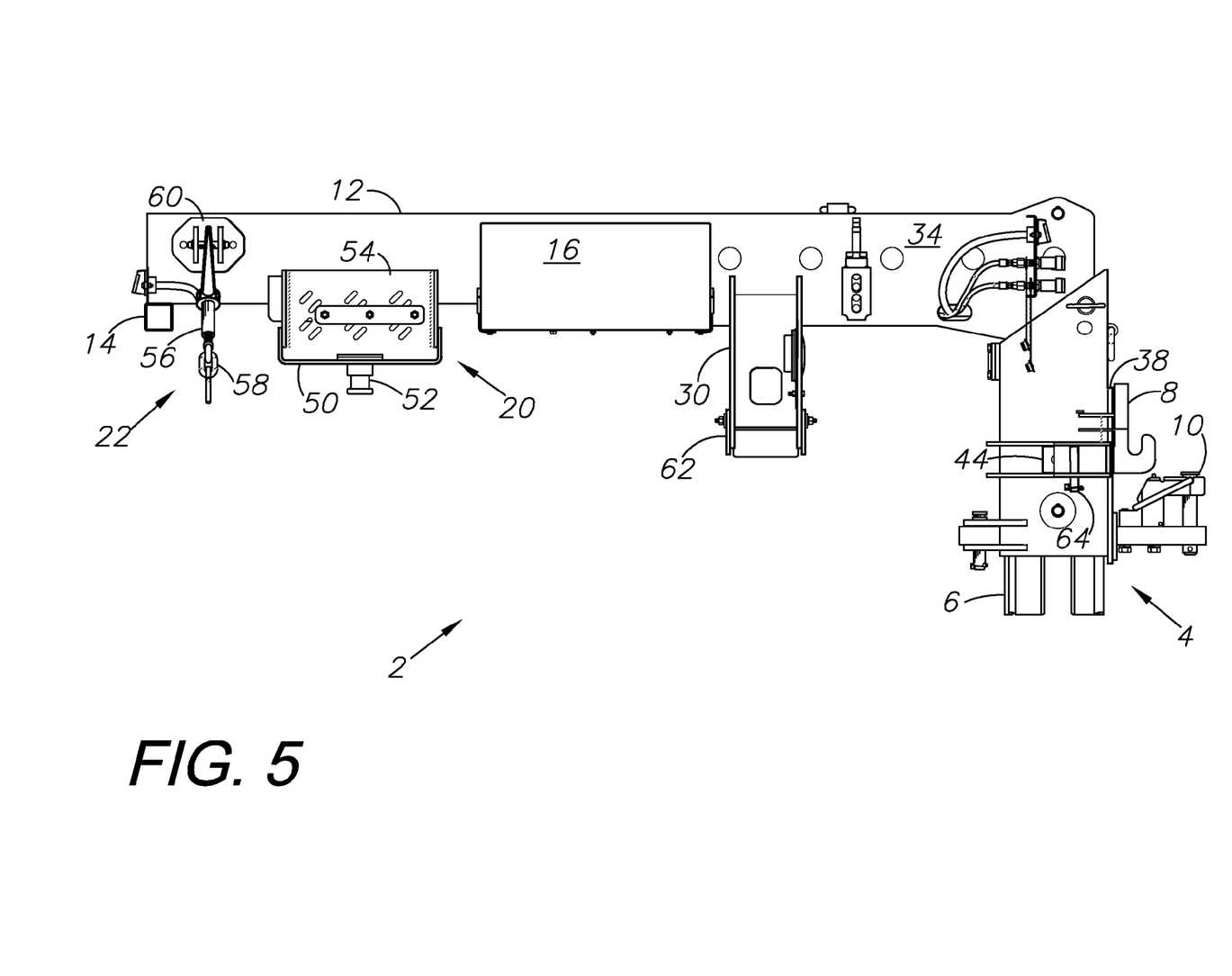
FIG. 5 is a side elevation view of an embodiment of the present invention, the reverse side elevation being generally a mirror image thereof

The frame mount assembly 30 is connected to the main beam member 12, or alternatively to the side panels 34. The frame mount assembly 30 includes reliefs 32 for receiving a standard semi-truck frame 26. The reliefs 32 may be modified using adjustment plates 62 to accommodate truck frames of different sizes by bolting additional plate members onto the mount assembly 30, as shown in FIG. 5. The frame mount assembly 30 is designed to rigidly support the transport hitch system 2 while allowing for quickly mounting or un-mounting the system from a semi-truck 24.

A pair of weather proof storage boxes is mounted to the main beam member 12. The passenger side box 17 includes a weather proof lid 18 and contains a battery 19 and a battery charger and isolator for recharging and regulating power to and from the battery. The batter 19 is further electrically connected to the mechanical or hydraulic system which powers the lift assembly 4. When not in use, the power from the batteries is cut off, retaining maximum charge within the batteries. The driver side box 15 also includes a weather proof lid 16 and contains a hydraulic power pack, which may include a hydraulic reservoir or other components for operating and powering the lift assembly 4.

A kingpin connection assembly 20 is bolted to the main beam member 12 and serves to connect the transport hitch system 2 with a standard semi-truck tractor 24 via the truck's fifth wheel 28. The kingpin connection assembly 20 is comprised of a base connector plate 50 and a pair of upstanding steel plates 54 which are bolted or otherwise affixed to the main beam member 12. A kingpin 52 is mounted to the base connector plate 50 and allows connection with the fifth wheel 28.

Figure 9:
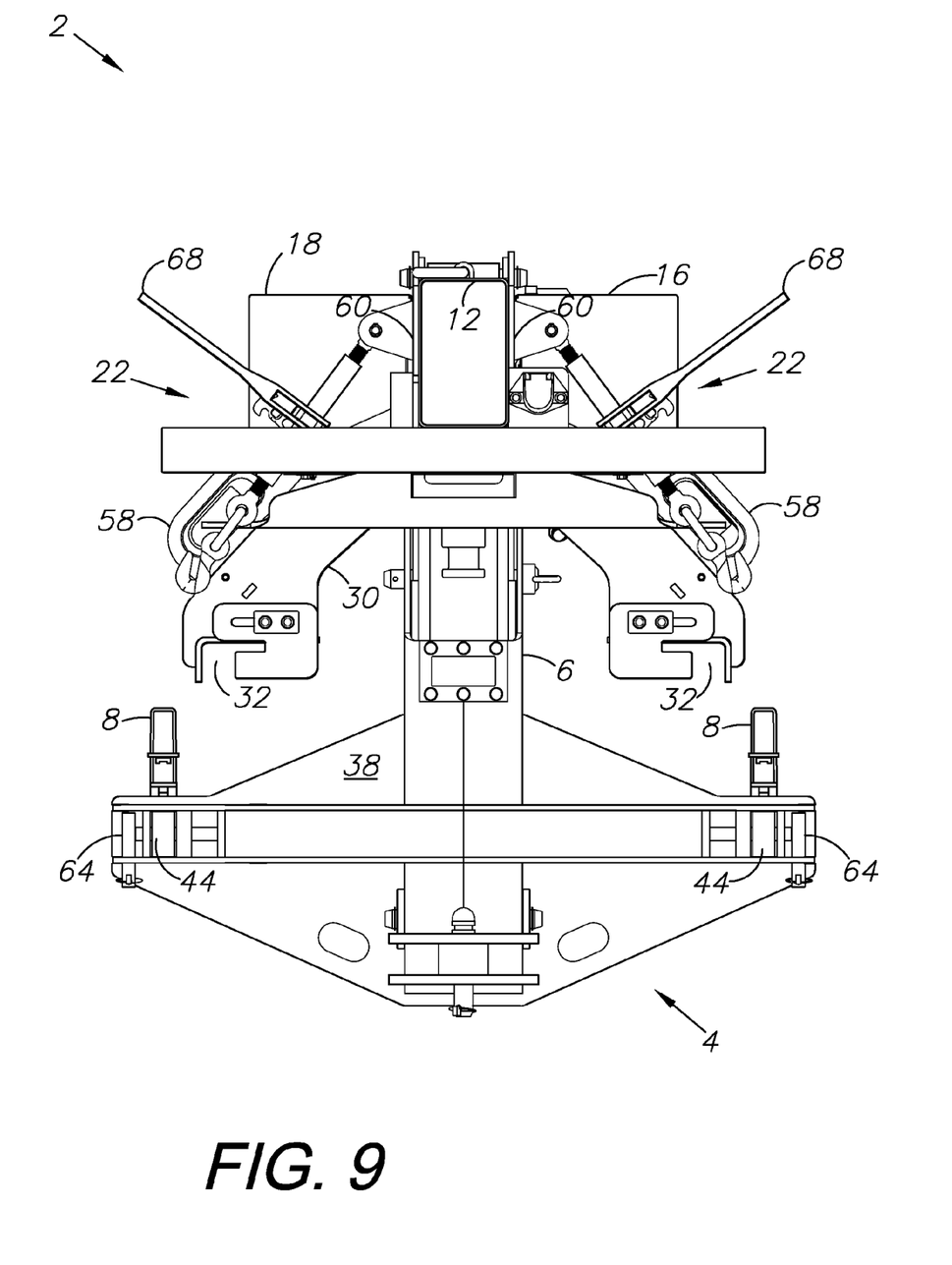
FIG. 9 is a front elevation view of an embodiment of the present invention.

A pair of binder assemblies 22 are bolted to the main beam assembly 12. The binder assemblies may include a hydraulic piston-and-cylinder 56 or some other means by which the binder assembly 22 secures the binder connection with the truck frame 26. The binder assembly further includes a binder linkage 58, which may be comprised of a length of steel chain or other means by which the linkage assembly may physically connect with the truck frame. Once the binder linkage 58 is connected to the truck frame 26, the hydraulic cylinder 56 retracts to remove the slack from the binder linkage 58, and establishes a strong mounting connection with the truck frame. The binder assemblies 20 are attached to the main beam member 12 by bolting or otherwise affixing a binder bolt plate 60 to the side of the main beam member. Alternatively, the binder assemblies may be comprised of standard lever chain binders including a lever arm for manually increasing the tension of the binder linkage 58, as shown in FIG. 9.

A front bar 14 is bolted, welded, or otherwise affixed to the front end of the main beam member 12.

Figure 6:
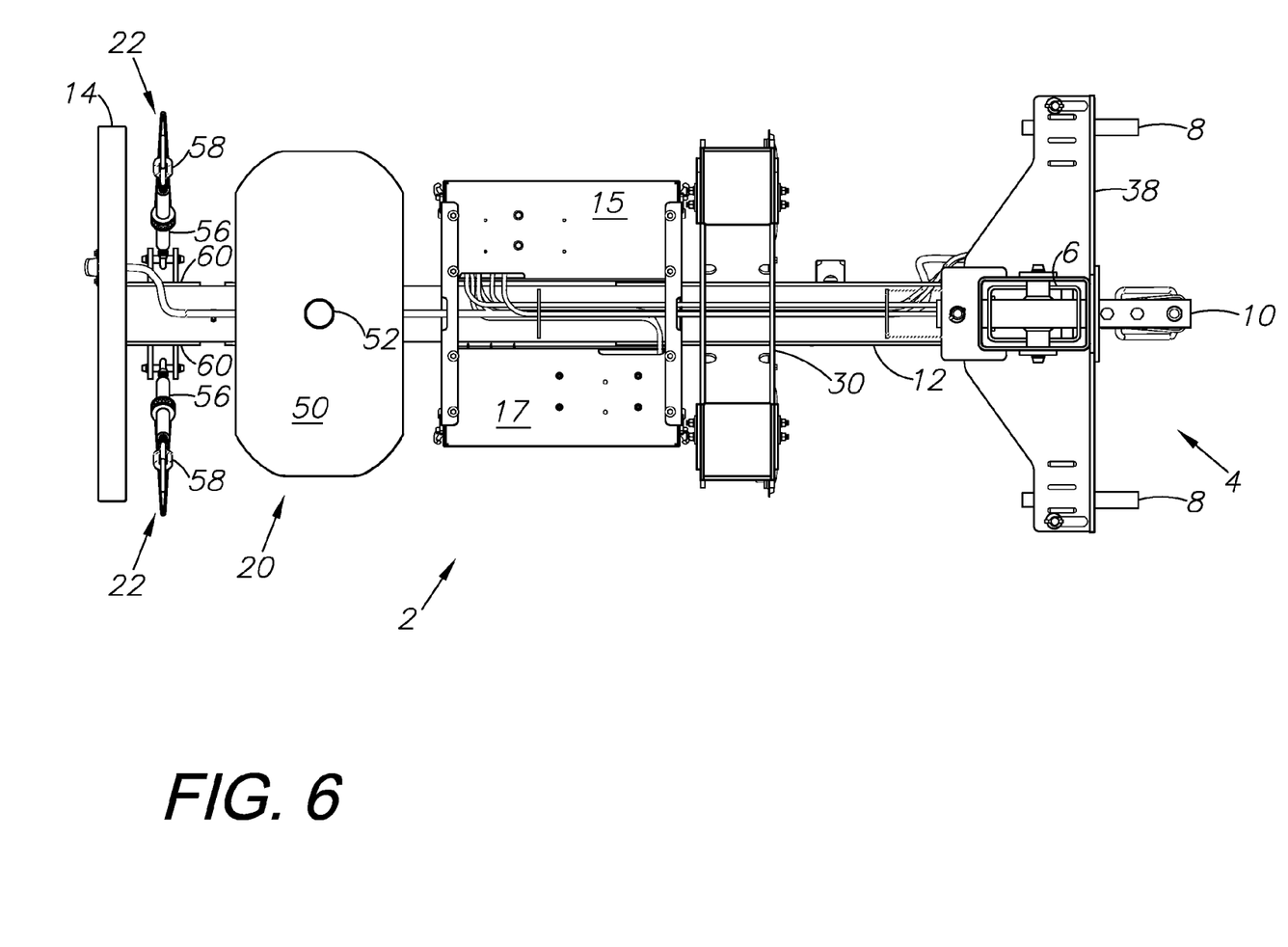
FIG. 6 is bottom plan view of an embodiment of the present invention.
Figure 7:
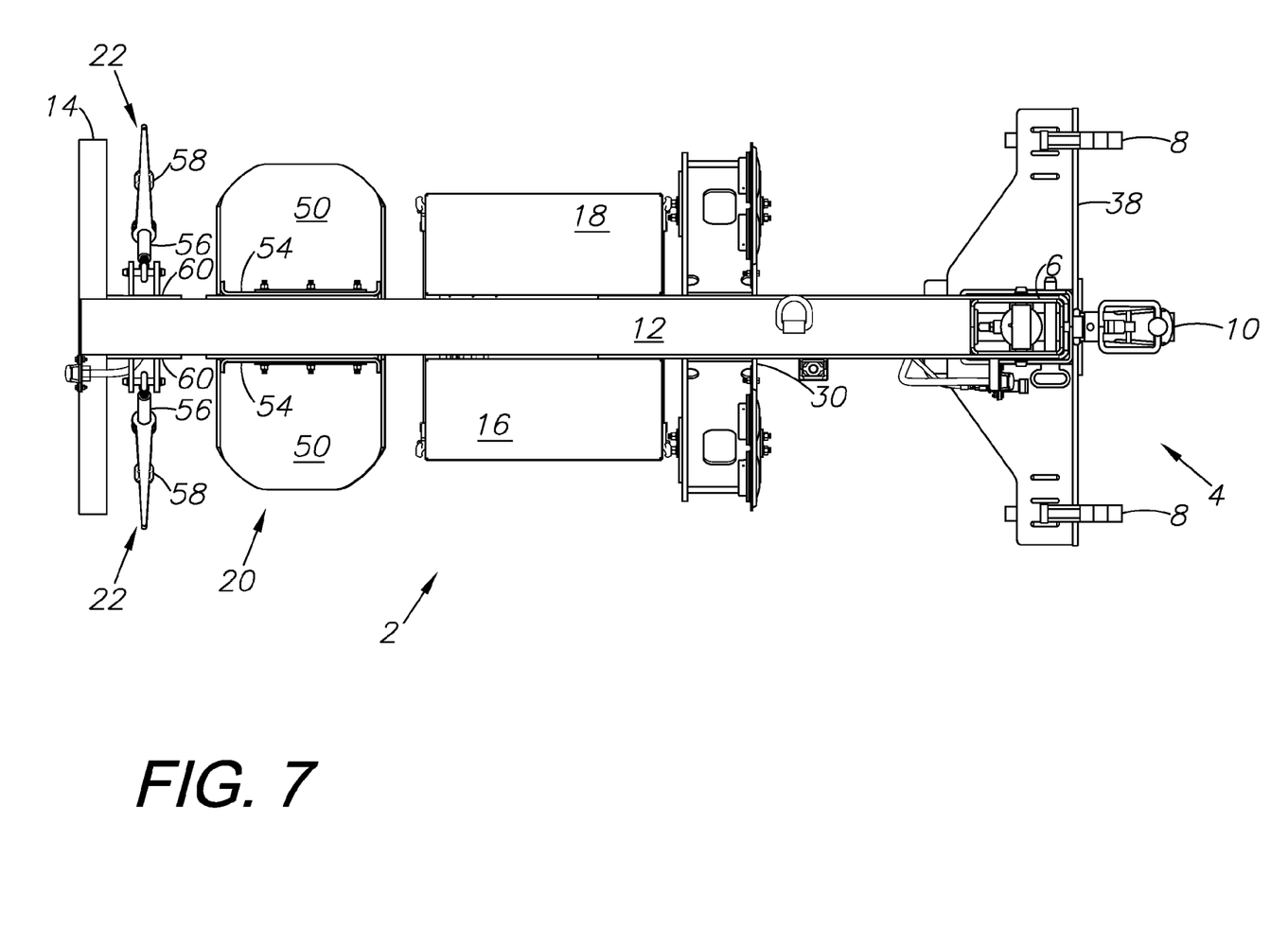
FIG. 7 is a top plan view of an embodiment of the present invention.
Figure 8:
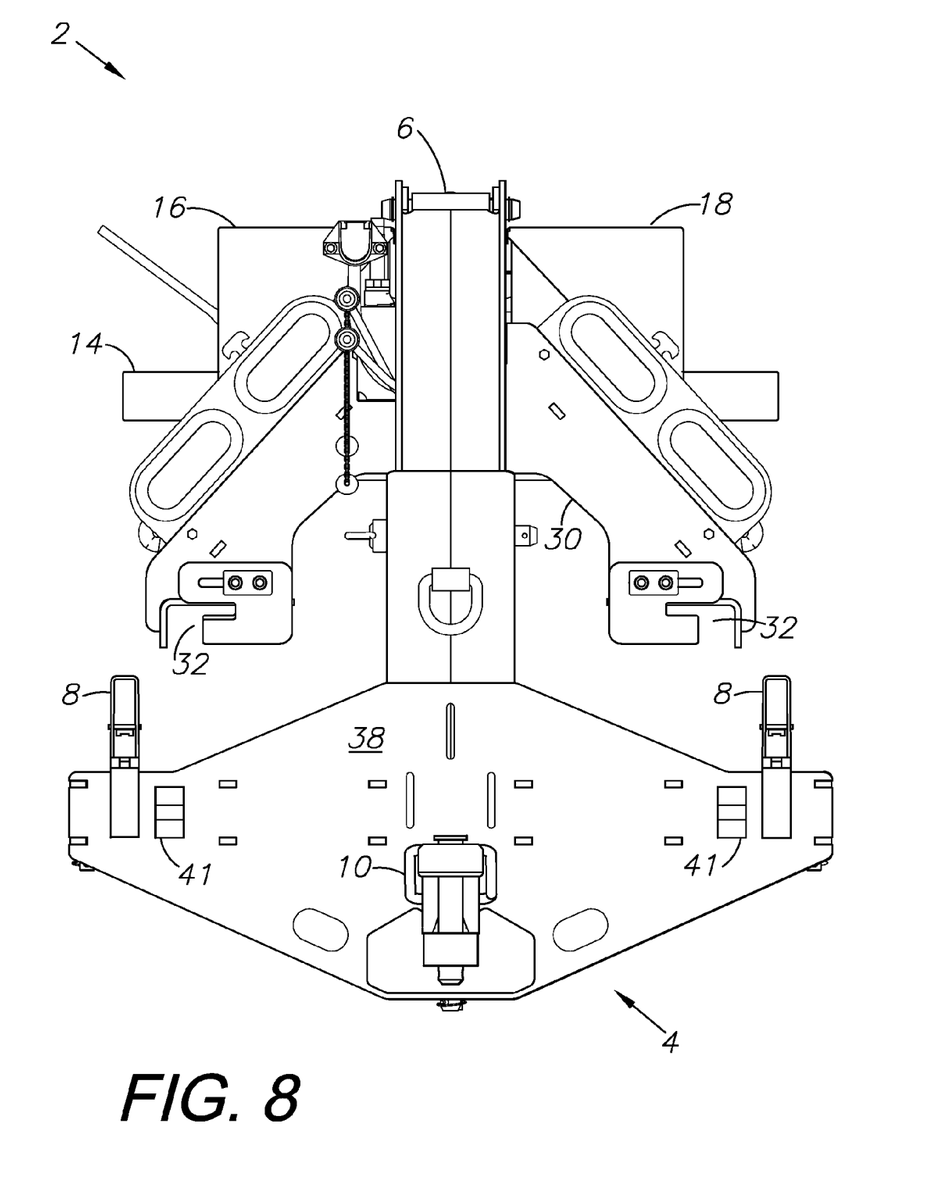
FIG. 8 is a rear elevation view of an embodiment of the present invention.

FIGS. 5-9 provide further detail of a preferred embodiment of the present invention. FIG. 6 demonstrates how electrical and hydraulic lines may run down the length of the main beam member 12 to carry power from the battery 19 contained within the storage box 17 to the lift assembly 4.

The lift assembly 4 may be controlled using a typical control unit, either mounted directly to the transport hitch system 2 or in a remote location. The control system may be wired or wireless. The control system would control the electrical, mechanical, or hydraulic means by which the lift assembly 4 is raised or lowered along the lift mast.

During a typical operation of the transport hitch system 2, the system is loaded onto a standard semi-truck tractor 24 using a forklift or other means. The transport hitch system 2 is connected to the truck 24 using three connection means: the frame mount 30, the kingpin connection assembly 20, and a pair of binders 22. Once the system 2 is secured to the truck 24, the lift assembly 4 is lowered.

A pair of hooks 8 are inserted into the appropriate receiver slots 40, 41 located on the lift assembly back plate 38. If the implement to be loaded requires a Cat. III type hitch, the outermost receiver slots 40 are used; and if the implement to be loaded requires a Cat. II type hitch, the innermost receiver slots 41 are used. The hitch pin 10 is also inserted into the hitch pin receiver slot 42.

The truck 24 is backed into position whereby the lift assembly 4 is able to connect with the implement 66. The lift assembly 4 is first lowered into position, as depicted in FIG. 3, and then is raised to the appropriate towing height h, as depicted in FIG. 1. The implement can then be transported to a desired destination. The entire loading process is designed to take a matter of minutes.

It is to be understood that the invention can be embodied in various forms, and is not to be limited to the examples discussed above. The range of components and configurations which can be utilized in the practice of the present invention is virtually unlimited.

Having thus described the disclosed subject matter, what is claimed as new and desired to be secured by Letters Patent is:

1. A system for loading and transporting a load on a vehicle including a vehicle frame and a vehicle longitudinal axis, which system comprises:

a longitudinal structural member including a proximal end and a distal end;

a vertical structural member including a top end and a bottom end;

a lift assembly connected to said vertical structural member;

said lift assembly being vertically movable relative to said vertical structural member;

wherein said lift assembly includes a hydraulic piston-and-cylinder unit within said lift mast, said lift mast and said piston-and-cylinder unit having vertically aligned translational axes along said lift mast, said piston-and-cylinder unit being adapted for raising and lowering said lift assembly between raised and lowered positions;

a load connector connected to said lift assembly and adapted for connection to said load;

a structural brace member with an A-shaped configuration including a pair of brace member legs each connected to a respective frame member and extending downwardly therefrom, said structural brace member further including an upper end connected to said structural side plates, said structural brace member mounting said transport system body to said vehicle frame;

a hydraulic fluid power supply system connected to said piston-and-cylinder units and including an electrically-powered hydraulic pump, said hydraulic fluid power supply system further including an electrical battery mounted on said longitudinal structural member between said kingpin connection assembly and said longitudinal structural member distal end, said battery being capable of powering said lift assembly;

a pair of binder assemblies, each binder assembly including a binder linkage and a binder connection plate;

said binder connection plate affixed to said transport system body;

wherein said binders are capable of connecting said transport system body to the vehicle frame;

wherein said binder assemblies each includes a piston-and-cylinder unit configured for applying tension to a respective binder assembly, said piston-and-cylinder units being adapted for adjusting said binder assemblies for ideal connection to said vehicle; and wherein said lift assembly being configured for lifting said load to a transport height.

2. The system according to claim 1 which further comprises:

a kingpin connection assembly including a kingpin and a structure, said structure being affixed to said transport system body;

wherein the vehicle includes a fifth wheel; and wherein said kingpin connection is capable of connecting said transport system body to said fifth wheel.

3. The system according to claim 1 which further comprises:

said lift assembly including a vertical plate having a plurality of receiver slots including a first pair of slots and a second pair of slots;

wherein said first pair of slots is spaced to accommodate a Cat. II two-point hitch; and wherein said second pair of slots is spaced to accommodate a Cat. III two-point hitch.

4. The system according to claim 1 wherein said load connector includes a pair of hooks configured to receive a drawbar attached to an implement.

5. The system according to claim 1 wherein the angle formed between said longitudinal structural member and said vertical structural member is approximately 90°.

6. A method for loading and towing an implement by a vehicle including a frame and a fifth wheel, and a longitudinal axis, the method comprising the steps:

providing a towing apparatus including a towing apparatus structure, said structure including a longitudinal structural member joined to a vertical structural member forming a 90° angle;

providing a lift assembly, said lift assembly being moveably connected to said vertical structural member and said lift assembly including a hydraulic piston-and-cylinder unit within said lift mast, said lift mast and said piston-and-cylinder unit having vertically aligned translational axes along said lift mast, said piston-and-cylinder unit being adapted for raising and lowering said lift assembly between raised and lowered positions;

providing a kingpin affixed to said towing apparatus structure, said kingpin capable of mounting onto the vehicle's fifth wheel;

providing a mounting frame affixed to said towing apparatus structure, said mounting frame capable of mounting onto the vehicle's frame, and said mounting frame including a structural brace member with an A-shaped configuration including a pair of brace member legs each connected to a respective frame member and extending downwardly therefrom, said structural brace member further including an upper end connected to said structural side plates;

providing a pair of binder assemblies, each binder assembly including a binder linkage and a binder connection plate, wherein said binder connection plates are affixed to said transport system body in proximity to the proximate end of said longitudinal structural member, and wherein said binder linkages are capable of connecting to said vehicle frame;

mounting said towing apparatus to the vehicle, wherein said longitudinal structural member is parallel to the longitudinal axis of the vehicle;

positioning the truck relative to an implement;

vertically lowering said lift assembly to a height capable of receiving said implement with a hydraulic fluid power supply system connected to said piston-and-cylinder units and including an electrically-powered hydraulic pump, said hydraulic fluid power supply system further including an electrical battery mounted on said longitudinal structural member between said kingpin connection assembly and said longitudinal structural member distal end, said battery being capable of powering said lift assembly;

connecting said lift assembly to said implement;

vertically raising said lift assembly to a towing height with said hydraulic fluid power system; and transporting said implement to a new location using said vehicle and said towing apparatus.

7. The method of claim 6 wherein said lift assembly includes a pair of mounting hooks capable of receiving an implement hitch, the method including the step:

spacing the mounting hooks to receive a Cat. II two-point hitch.

8. The method of claim 6 wherein said lift assembly includes a pair of mounting hooks capable of receiving an implement hitch, the method including the step:

spacing the mounting hooks to receive a Cat. III two-point hitch.

9. The method of claim 7 wherein said lift assembly includes a pair of mounting hooks capable of receiving an implement hitch, the method including the step:

spacing the mounting hooks to receive a drawbar.

* * * * *